United States Patent [19]

Ito

[11] Patent Number: 5,032,712
[45] Date of Patent: Jul. 16, 1991

[54] SIGNAL ACCUMULATION IMAGE READING APPARATUS

[75] Inventor: Yasuo Ito, Inagi, Japan

[73] Assignee: Canon Kabushiki Kaisha, Tokyo, Japan

[21] Appl. No.: 423,359

[22] Filed: Oct. 18, 1989

[30] Foreign Application Priority Data

Oct. 19, 1988 [JP] Japan .............................. 63-261454
Oct. 31, 1988 [JP] Japan .............................. 63-273008

[51] Int. Cl.[5] ............................................ H01J 40/14
[52] U.S. Cl. .................................. 250/208.1; 358/486
[58] Field of Search ........................... 250/208.1, 205; 358/486, 496, 497

[56] References Cited

U.S. PATENT DOCUMENTS

| 4,160,279 | 7/1979 | Fuwa | 358/486 |
| 4,413,287 | 11/1983 | Torpic et al. | 358/486 |
| 4,591,727 | 5/1986 | Gaebelein | 358/486 |
| 4,814,597 | 3/1989 | Kruger et al. | 250/205 |

Primary Examiner—David C. Nelms
Assistant Examiner—Khaled Shami
Attorney, Agent, or Firm—Fitzpatrick, Cella, Harper & Scinto

[57] ABSTRACT

Image reading equipment has a light source for irradiating an original image, a reader for photoelectrically reading the original image, a detector for detecting a peak output level of said reader and a controller for controlling a read operation by the thus detected peak level. The original image is scanned at a speed appropriate for the light quantity exposing the original so that a stable reading of the original is realized even when the quantity of exposing light is deficient.

11 Claims, 10 Drawing Sheets

FIG. 1A
AT NORMAL TEMPERATURE

FIG. 1B
AT LOW TEMPERATURE

SIGNAL ACCUMULATION IMAGE READING APPARATUS

BACKGROUND OF THE INVENTION

1. Field of the Invention

The present invention relates to an image reading apparatus for photoelectrically reading an image of an original.

2. Related Background Art

Various image reading apparatuses have been proposed as an apparatus for inputting an image into a facsimile machine, digital copying machine, or a computer, wherein the image of an original is exposed by a light source and an image signal is formed by photoelectric conversion of the light reflected by the original.

In such image reading apparatus, one of the points requiring caution for accurate reading of the image with proper density and contrast is the adjustment of the light quantity of the light source used for exposure of the original at a proper level. The assignee of the present invention proposed systems for adjusting the light quantity of the light source at the proper level in U.S. Pat. No. 4,677,287 and U.S. Pat. No. 4,691,365.

Figure 1A:
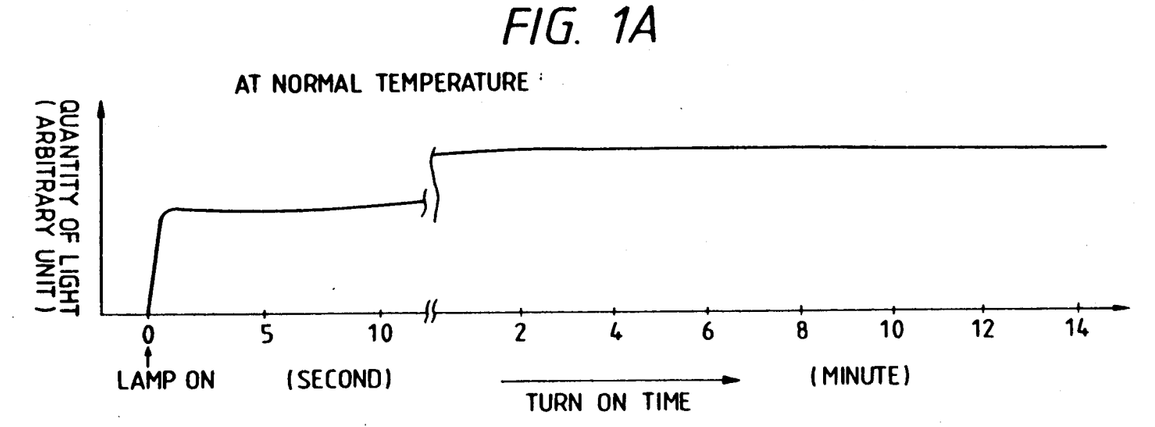
FIGS. 1A and 1B are views indicating the rise characteristics of light quantity of a fluorescent lamp.
Figure 1B:
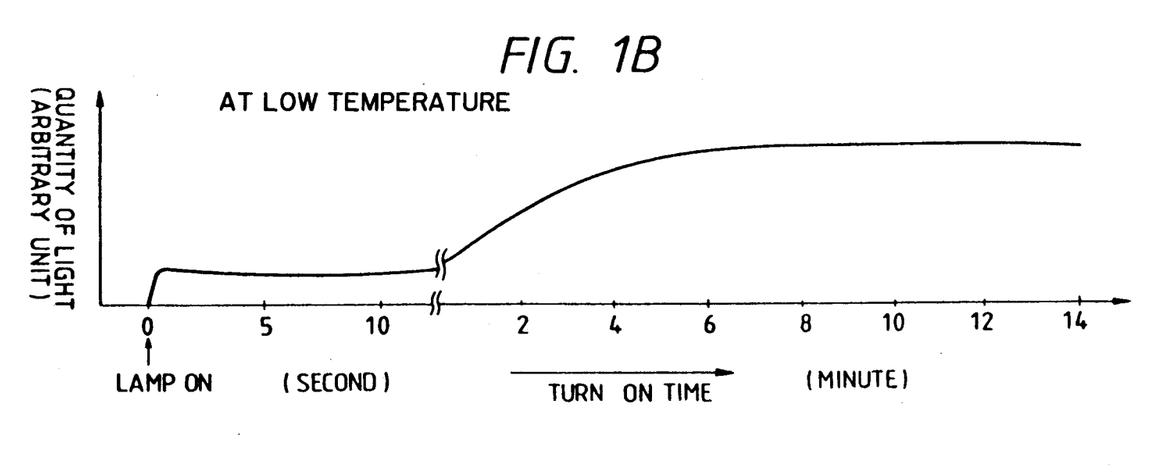

However, for example, when a fluorescent lamp is used for the light source, there is a drawback in that a longer waiting time is required at low temperature (FIG. 1B) in comparison with such waiting time at normal temperature (FIG. 1A) until the light quantity reaches the proper level. Thus the throughput in unit length of time of reading decreases.

In order to shorten such waiting time, it may be useful to provide a heater for heating the light source, but the cost of the apparatus should increase too much.

SUMMARY OF THE INVENTION

In one aspect, the present invention has been made in view of the above facts and provides an image reading apparatus which improves the throughput of reading of an original.

In another aspect, the present invention provides an image reading apparatus capable of reading an original at low cost, without an extended waiting time even when environmental temperature is low.

In still another aspect, the present invention provides an image reading apparatus which suppresses variation of the level of image data of an original owing to variation of the light quantity, and thus enabling proper reading of the original.

The aforesaid objective, effect and other objectives and effects shall be evident from the following explanation.

DESCRIPTION OF THE PREFERRED EMBODIMENTS

The present invention will be explained hereinafter in reference to the illustrative embodiments.

Figure 2:
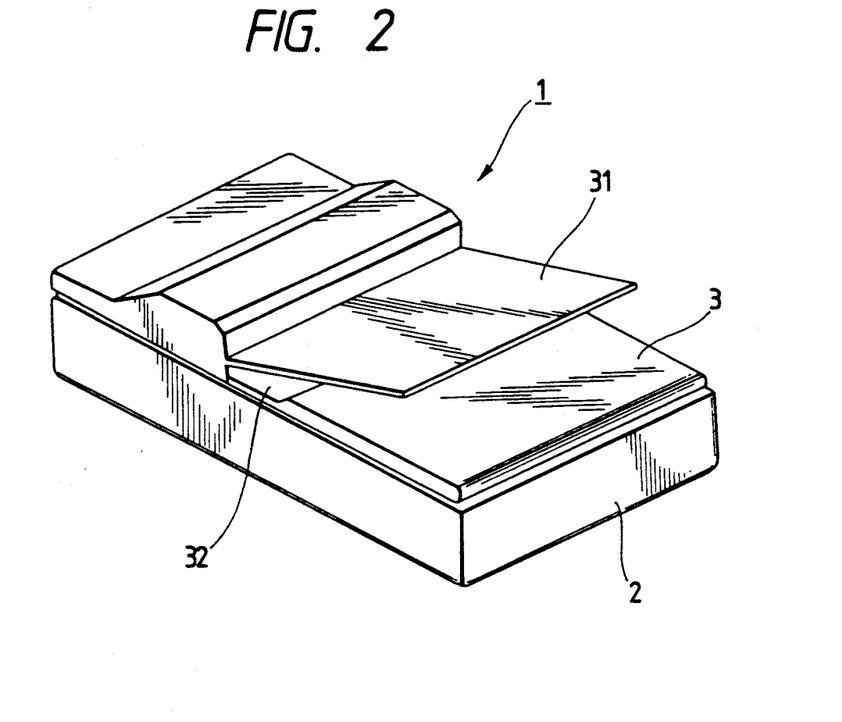
FIG. 2 is a perspective view of the appearance of an image reading apparatus according to a first illustrative embodiment of the present invention.
Figure 3:
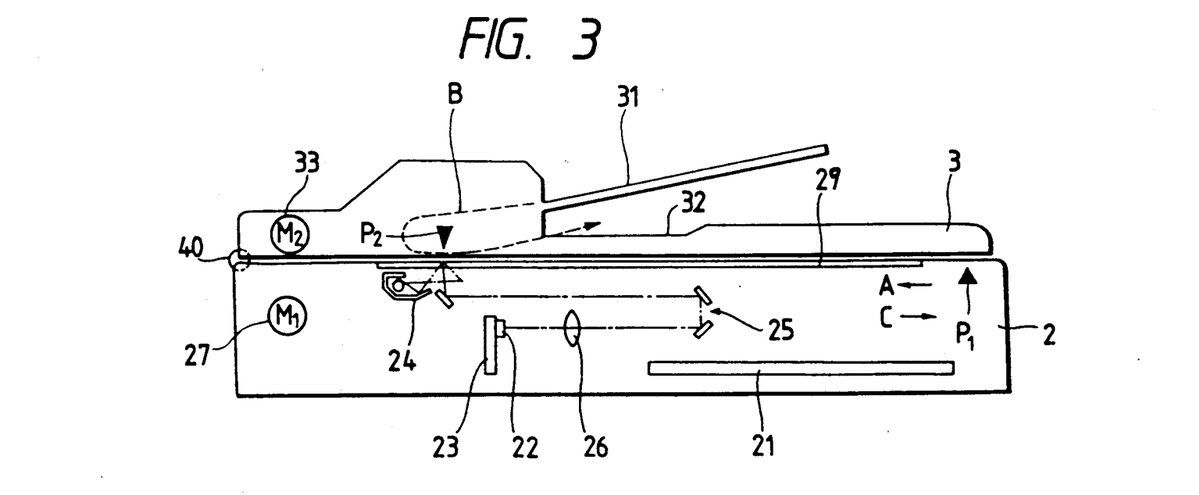
FIG. 3 is a view illustrating an internal construction of the apparatus shown in FIG. 2.

FIG. 2 is a perspective view of the appearance of an example of an original image reading apparatus according to the present invention, and FIG. 3 illustrates an internal construction thereof.

Referring now to FIGS. 2 and 3, 1 is the entire original image reading apparatus (hereinafter abbreviated as a reader). 2 is a reader main body which is so arranged that an original on a platen glass 29 (image facing downward) is illuminated by original illuminating unit 24, and via reflective mirrors 25, an original image is formed by lens 26 on the image sensor 22, as disclosed in U.S. Pat. Application Ser. No. 325,023, filed MAR. 20, 1989, which comprises a plural number of light receiving elements arranged in a main scanning direction.

Original illumination unit 24 and mirrors 25 can move in a subscanning direction, which is perpendicular to the main scanning direction, by means of a driving system (not shown) employing stepping motor 27.

3 is an automatic document feeder (hereinafter abbreviated as ADF) wherein a sheet shaped original (image facing upward) on a original placing table 31 is delivered in a direction of arrow B (shown by broken line in FIG. 3) by a delivery system not (shown) employing stepping motor 33, and then discharged on original discharge table 32.

In this illustrative embodiment, it is so arranged, for example, that ADF3 is able to turn around the axis 40 as against reader main body 2, and ADF3 is set at a position indicated in the drawing.

Figure 4:
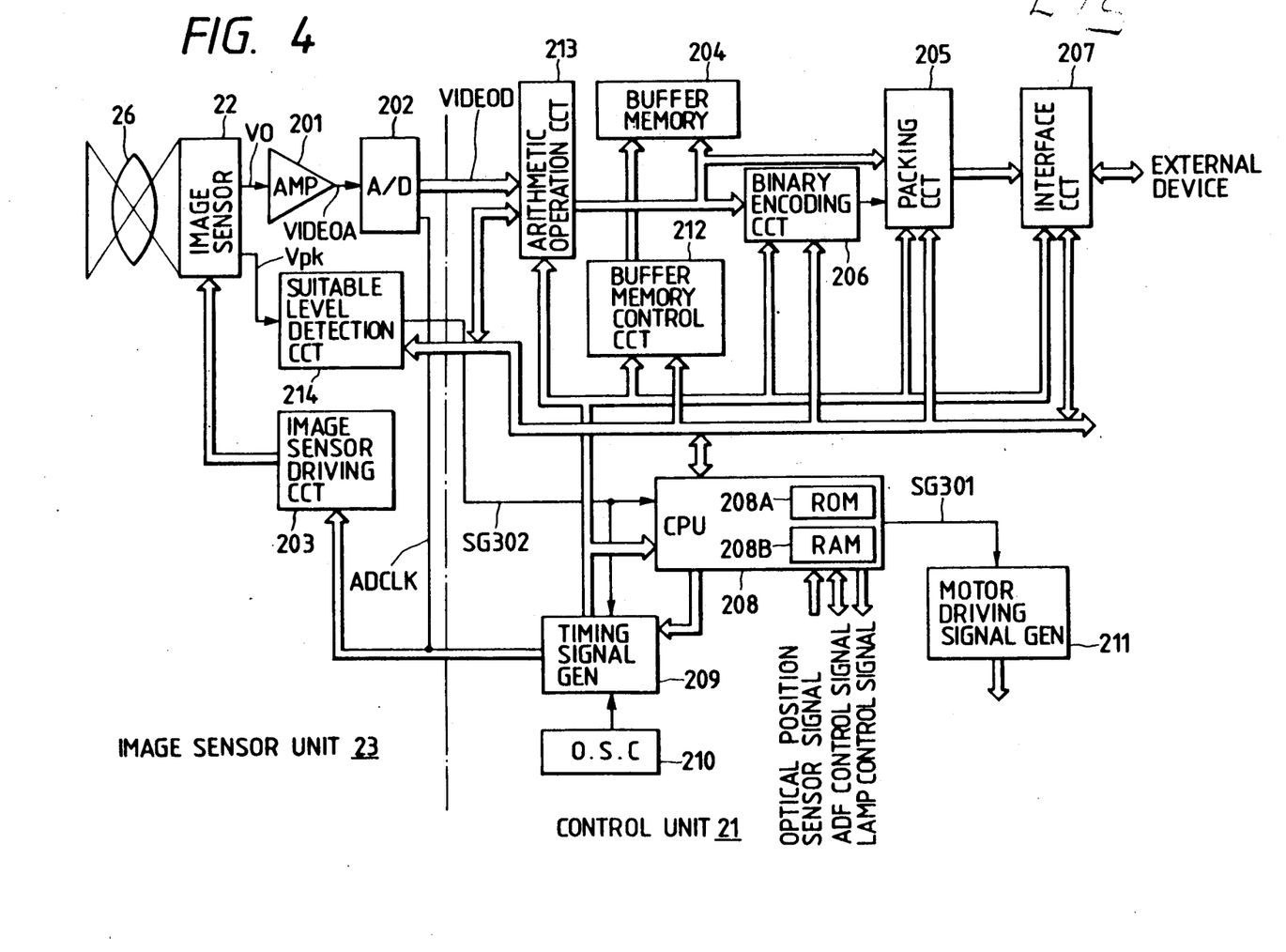
FIG. 4 is a block diagram indicating an important circuit of FIG. 3.

21 is a control unit and 23 is an image sensor unit, an example of circuit construction of the two being shown in FIG. 4.

The performance of reader 1 will be explained in reference to FIGS. 3 and 4. The reader 1 of this illustrative embodiment has two modes, one being a "sheet (through) mode" wherein a sheet original having no binded part is read while being carried by ADF3 in the subscanning direction, and another being a "book mode" wherein an original having binded part such as a book is read while being placed on platen glass 29 by keeping ADF3 in a released state and moving original illumination unit 24 and mirror 25 in the subscanning direction.

First, the "sheet (through) mode" will be explained.

(1) "Sheet mode"

Reader 1 of this illustrative embodiment is always connected to an external apparatus (for example, digital printer, personal computer etc.), and communication with the these external apparatuses and feeding of image data to these external apparatuses are executed via an interface circuit 207.

Various mode instructions are entered by the external apparatus while the original is placed on the H) original placing table 31 of ADF3 (image facing upward). Such instructions are ones, for example, as to which one should be selected among pixel densities 300 dpi, 150 dpi and 75 dpi, or whether the pixel signal should be a binary signal or a multi-level signal, etc. When such instruction is received by CPU208, CPU208 (208A is the ROM housing the control program while 208B is the RAM for work) delivers a control signal to timing signal generating circuit 209 or packing circuit 205, and previously sets said pixel density, pixel signal form, etc.

An original read reference position sensor (not indicated in the drawing) in "sheet mode" checks as to whether the original illumination unit 24 of an optical system is at an original reading position (the position indicated by P2 in FIG. 3) for use in a sheet mode using ADF3.

The system is so constructed that if the original illumination unit 24 is not at the ADF original read position, it shall be moved prior to start of a reading operation by an instruction for start of reading of the next original.

When the original read start instruction is given by an external apparatus in such a condition, CPU208 outputs a lamp control signal to turn on a lamp of illumination unit 24, and outputs an instruction for start of original feeding to ADF3. Thus, the original placed on the original placing table 31 of ADF3 is carried in a direction of arrow B along the route indicated by the broken line of FIG. 3.

The reader 1 of this illustrative embodiment employs a stepping motor for carrying originals from ADF3 and for driving of an optical scanning system. In such a motor, the speed of the carrying or the scanning can be freely changed by changing the frequency of the pulse signal (SG301) for motor driving. In ADF3, in order to detect whether the leading edge of the original being now carried has reached the original illumination position of reader 1, an original leading edge detecting sensor (not indicated in the drawing) provided on ADF3 can be used.

The image formed on the image sensor 22 is converted into digital values by analog-digital converter 202, to be described later, and stored temporarily in buffer memory 204. However since the digital values obtained before the original reaches the original reading position P2 by ADF3 are not those of the image of the original to be read, a control signal "DO NOT STORE" is given by CPU208 to the buffer memory control circuit 212 so that the memory does not store the image data delivered in the meantime.

When the original reaches the original reading position P2, CPU208 gives the control signal "READY TO STORE" to the buffer memory control circuit 212, and a line of image data having been read are stored in the buffer memory 204.

In this illustrative embodiment, buffer memory 204 has a 4 line buffer construction, so that the image data shall once be stored in buffer memory 204 and then read out.

The image data read out from buffer memory 204 are binary encoded by binary encoding circuit 206 and entered to packing circuit 205 or directly supplied to the packing circuit 205 as multi-level (8 bits in the case of this illustrative embodiment) data and then applied to interface circuit 207 to be transferred to the external control devices one after another.

At the time when the original leading edge detecting sensor detects the trailing edge of the original, CPU208 outputs the control signal "DO NOT STORE" to the buffer memory control circuit 212 and after the lapse of a predetermined time, outputs the original reading end signal to the external apparatus. If no instruction for original reading is received from an external apparatus within a predetermined time thereafter, CPU208 turns off the lamp of original illumination unit 24 and disengages the stepping motor 33 to complete a series of operations.

(2) "Book mode"

In the case of "Book mode", the original is placed on the platen glass of FIG. 3 in such way that the right end of the original becomes its leading edge (the image facing downward).

The image illumination unit 24 of the optical system is so constructed that its initial position is at the right end in FIG. 3 (P1 position) and similar to the case of said "sheet mode", the reference position (P1 position) is checked by the read reference position sensor for "Book mode" (not indicated in the drawing). Here, the procedures of setting pixel density and the image signal prior to start of original reading are the same as in the case of the aforesaid "Sheet mode".

When an original read start instruction is entered by an external apparatus, CPU208 first outputs a lamp control signal to turn on the lamp of the original illumination unit 24 and then it causes the original illumination unit 24 to scan in the direction of arrow A of FIG. 3.

The distance from the initial position of the original illumination unit 24 to the front end of the original on the platen glass 29 is about 2-3 mm and during the course of this distance there is provided such a control that scanning of the optical system by the stepping motor 27 is stabilized.

In the meantime, CPU208 outputs a control signal "DO NOT STORE" to buffer memory control circuit 212 as in the case of "Sheet mode" and when original illumination unit 24 reaches said original leading edge position, CPU208 outputs the control signal "READY TO STORE" to buffer memory control circuit 212 and as in the case of "Sheet mode", the image data are transferred to external apparatus one after another via interface circuit 207.

Since the scanning length of the optical system is determined primarily by the number of pulses from CPU208 to drive stepping motor 27, when the necessary number of pulses are supplied to motor drive signal generating circuit 211, CPU208 judges that reading of the original is over and turns off the lamp and provides a reversing control of stepping motor 27, and after the lapse of a predetermined time, outputs the original read end signal to the external apparatus.

By the reversing control of stepping motor 27 by CPU208, original illumination unit 24 proceeds in the direction of arrow C of FIG. 3 and stops when the read reference position sensor for "Book mode" detects that the unit 24 has reached an initial position. Unless the succeeding instruction for start of original reading is given by the external apparatus during such a resetting period of the optical system, the unit 24 sits at the initial position and a series of operations ends.

(3) Circuit performance

Next, the performance of the circuit of the circuit block diagram shown in FIG. 4 will be explained.

In FIG. 3, image sensor 22 on image sensor unit 23 is driven by a timing signal generated by timing signal generation circuit 209 (210 of FIG. 4 indicates an oscillator) on the control unit 21, via image sensor driving circuit 203 (details are given later). The analog image signals (VIDEO A) given by image sensor 22 are amplified by amplifier 201 and entered into the analog/digital (A/D) converter 202. The image signal is converted from an analog signal into 8 bit digital signal (VIDEO D) by the timing signal ADCLK generated in timing signal generation circuit 209 and given to control unit 21.

Control unit 21 operates in the following manner upon receipt of said 8 bit digital signal (VIDEO D: hereinafter called image data).

Image data entered into control unit 21 are supplied to arithmetic operation circuit 213 which performs, for example, shading compensation operation, γ-compensation operation etc., where the data are processed and temporarily stored in buffer memory 204.

In this illustrative embodiment, buffer memory 204 has a 4 line buffer construction and it is controlled by buffer memory control circuit 212 which functions according to the timing signal generated by timing signal generating circuit 209. When conversion of pixel density is necessary, conversion to low density is effected for example by thinning the pulse entered into buffer memory 204.

Image data stored in buffer memory 204 are read out after a predetermined time and entered into binary encoding circuit 206 and packing circuit 205.

Binary encoding circuit 206 is a circuit which turns the data into binary data comparing them with a predetermined threshold level, while packing circuit 206 is a circuit where binary data of 8 picture elements are byte-packed in the case of said binary data and 8 bit data of one pixel are byte-packed in the case of multi-level data.

Image data packed in packing circuit 205 are transmitted to the external apparatus via the interface circuit 207.

Figure 5:
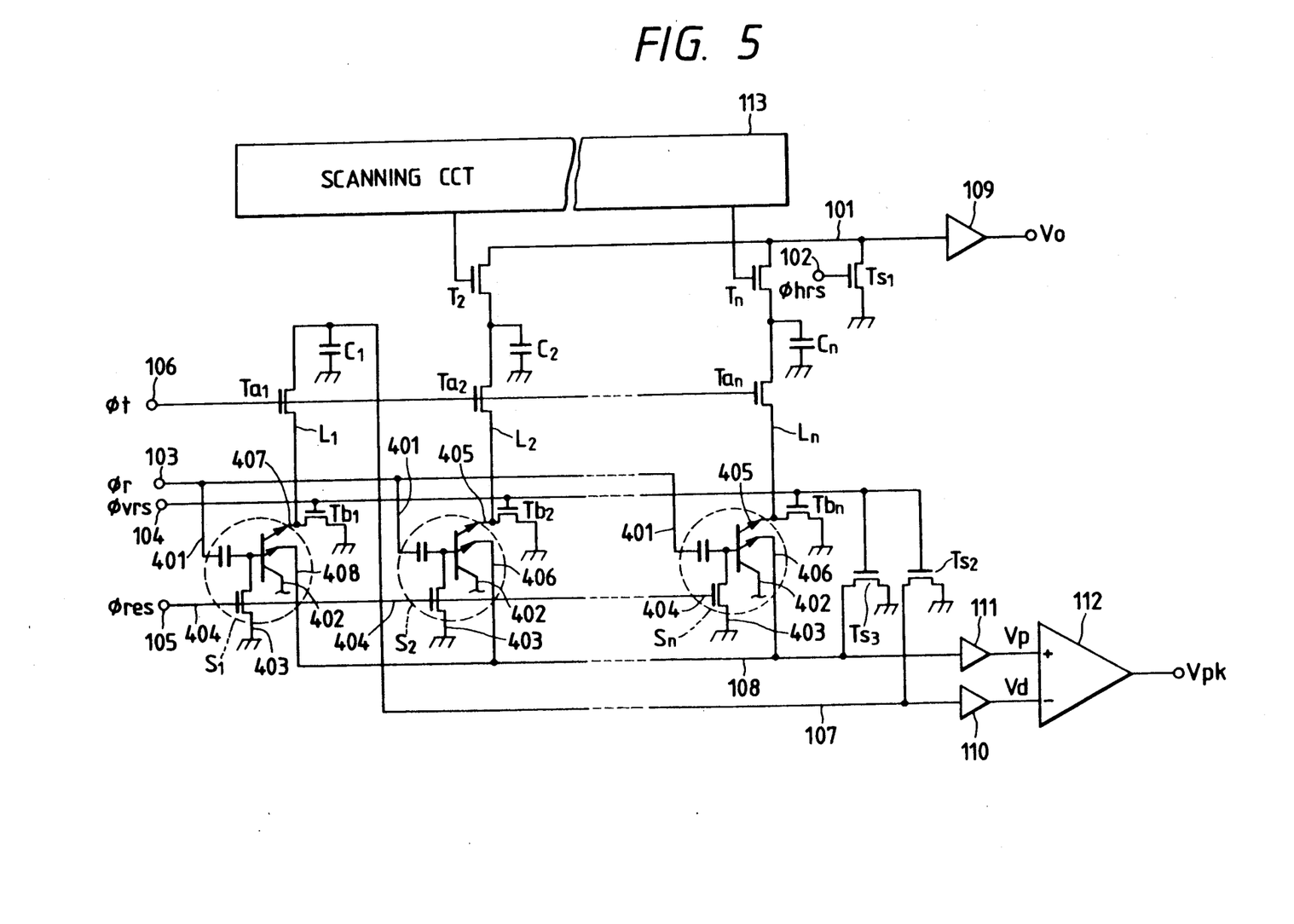
FIG. 5 is a circuit diagram of a photoelectric conversion apparatus.
Figure 6:
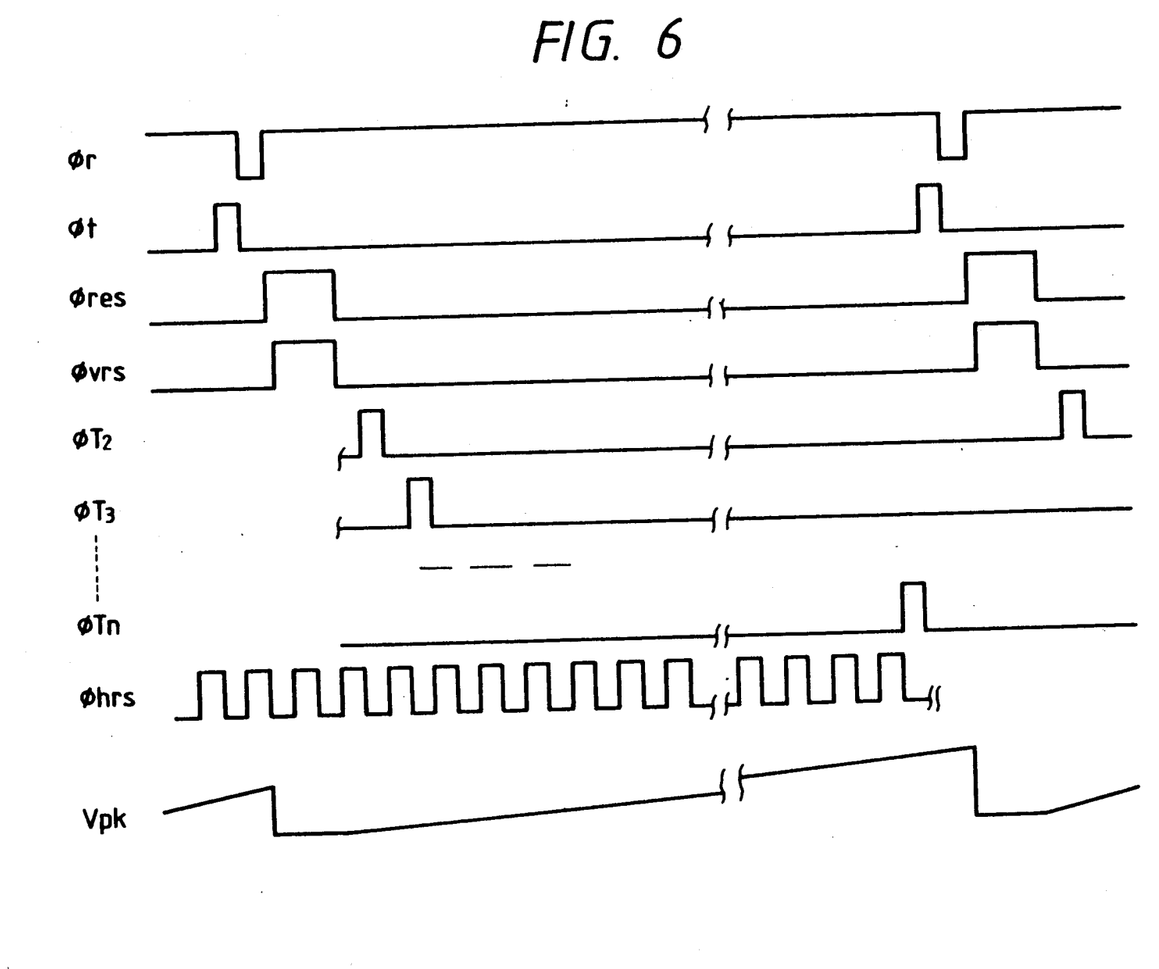
FIG. 6 is a performance timing chart of image sensor 22.

FIG. 5 illustrates an example of the circuit of image sensor 22 used in this illustrative embodiment, and FIG. 6 shows an example of input signal fed to terminals 102-105 and transistors T2-Tn of image sensor 22 and the peak detecting signal from amplifier 112. FIG. 5 shows the circuit described in U.S. Pat. Application Ser. No. 325,023, filed MAR. 20, 1989, its details being described in the specification of said application. In FIG. 5, the arrangement of light shading bit S1 comprising the photoelectric conversion cell and aperture bits S2-Sn are shown.

Capacitor electrode 401 of each bit is commonly connected to terminal 103 and a constant positive voltage is impressed on collector electrode 402. Electrode 403 of the reset MOS transistor is grounded and gate electrodes 404 are commonly connected to terminal 105.

Emitter electrodes 405 of the bits S2-Sn are respectively connected to perpendicular lines L2-Ln. Perpendicular lines L2-Ln are connected to condensers C2-Cn for accumulation of electric charge via transistors Ta2-Tan and connected to output signal line 101 via transistors T2-Tn. Output signal line 101 is grounded via the reset transistor Ts1 and connected to amplifier 109. Gate electrodes of transistors T2-Tn are respectively connected to the parallel output terminals of the scanning circuit and Transistors T2-Tn become ON one after another along the scanning circuit 113.

Perpendicular lines L2-Ln are grounded via transistors Tbs-Tbn and gate electrodes of transistors Tb2-Tbn are commonly connected to terminal 104.

Emitter electrode 407 of shading bit S1 is connected to the condenser C1 for accumulation of electric charge and line 107 via perpendicular line L1 and transistor Ta1.

Other emitter electrodes 408 are commonly connected to line 108 as in the case of the emitter electrodes of aperture bits S2-Sn.

Line 107 is grounded via transistor Ts2 and connected to amplifier 110.

Output terminals of amplifiers 110 and 111 are respectively connected to the input terminals of differential amplifier 112.

Hereunder is explained the performance of this illustrative embodiment.

Refresh operation

First the signal $\phi$ res is impressed on terminal 105 and the reset MOS transistor of each bit is turned on to make the potential of P base region of the all bits constant. Thereupon signal $\phi$ vrs is impressed on terminal 104 and transistors Tb1-Tbn, Ts2 and Ts3 are turned on and emitter electrodes 405-408 of all bits are grounded. A refresh pulse is impressed on the terminal 103, thus removing the accumulated carrier in the P base region as stated above.

Accumulating operation

Reset MOS transistor of each bit is set at OFF and a carrier corresponding to the luminous intensity of the light incident is accumulated in the P base region of the aperture bit.

Reading operation

Transistors Tb1-Tbn, Ts2 and Ts3 are turned off and emitter electrodes 405-408 of the bits are held in a floating state.

Subsequently, signal $\phi_t$ is impressed on terminals 106 and transistors Ta1-Tan are turned on and a read pulse is impressed on terminal 103. Thereby a dark signal is read out of the shading bit into perpendicular line L1 and accumulated in condenser C1 and signals from each aperture bit are entered into the perpendicular lines L2-Ln and accumulated respectively in condensers C2-Cn.

Then transistors Ta1-Tan are turned off, transistors T2-Tn are turned on one after another by scanning circuit 113 and signals are read into the output signal line 101 one after another and output via amplifier 109. At such time, upon the output of each signal, transistor Ts1 is turned on by signal $\phi$ hrs. and a residual electric charge of the output signal line 101 is refreshed.

Peak detecting operation

In parallel to the aforesaid reading action, peak detecting action is performed. By the read pulse being impressed on terminal 103 at the reading action, a dark signal from the shading bit S1 is accumulated in the condenser C1 and read onto line 107 while the signals from shading bit S1 and open bits S1-Sn are read into the line 108. However, since line 108 is connected to the common line, peak values of signals from shading bit S1 and aperture bits S2-Sn appear in the line 108. As the result, dark signal Vd is output from amplifier 110 and peak signal Vp is output from amplifier 111 and by calculating the difference of these signals |Vp-Vd| by differential amplifier 112, peak detecting signal Vpk removed of a noise component produced by the dark signal is obtained.

Quantity of light emitted by the lamp of illumination unit 24 is detected by the peak detecting signal Vpk and the aforesaid accumulation time and the speed of moving of the original or the illumination unit by stepping a motor are regulated line by line in accordance with the results of such detection.

In FIG. 6, $\phi_{T2}, \phi_{T3} \ldots \phi_{Tn}$ are the read signals given from scanning circuit 113 to transistors T2, T3 ... Tn of FIG. 5 while Vpk shown in FIG. 6 is the peak detecting signal of FIG. 5.

Next, the action of the real time detection of the proper level of electric signal data of the image having been read and the action to read original image will be explained with reference to FIGS. 4, 5, 6, 7, 8 and 9.

Figure 7:
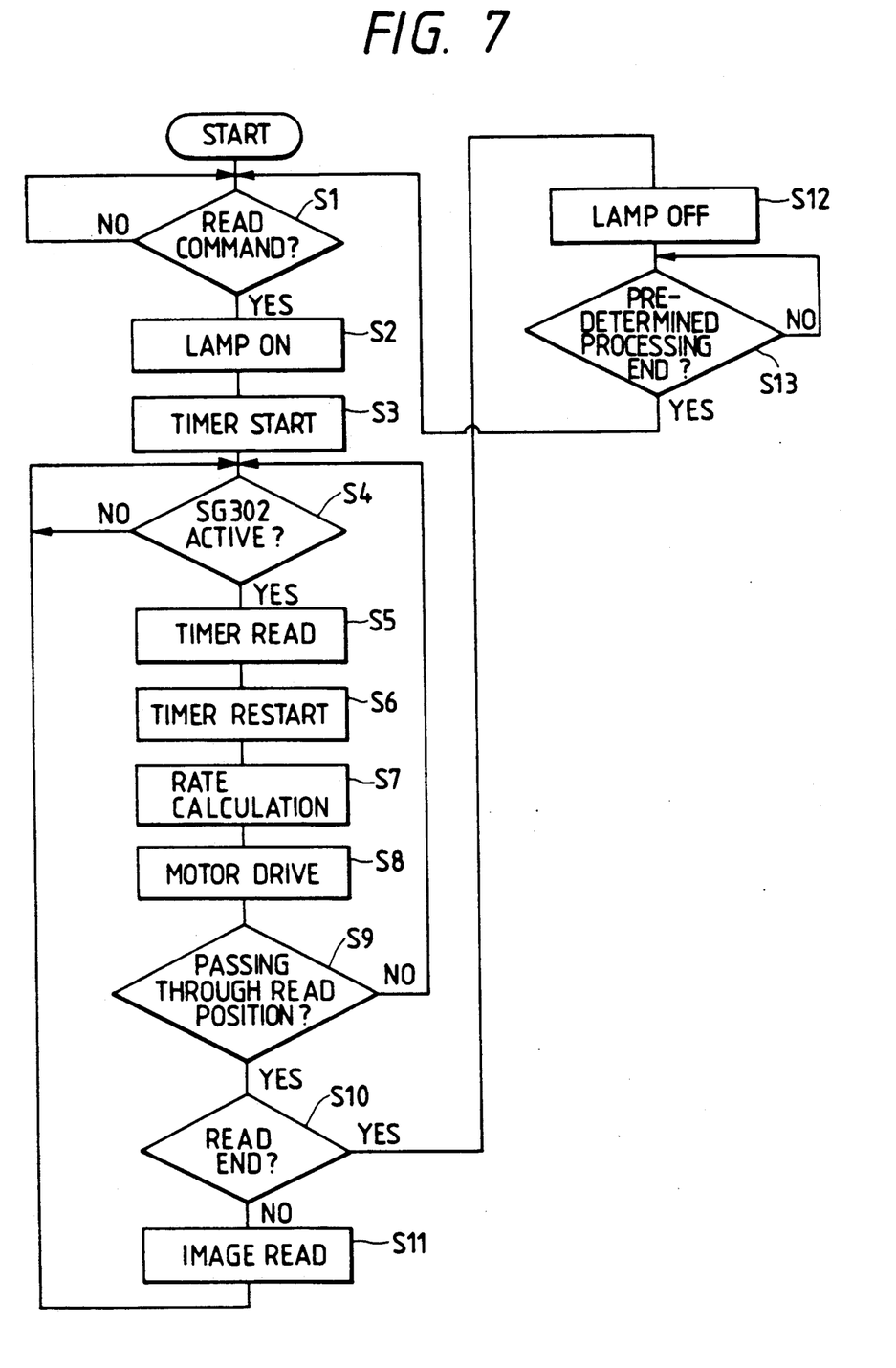
FIG. 7 is a flow chart indicating a performance of an illustrative embodiment of the present invention.

FIG. 7 is an example of the flow chart of this illustrative embodiment. At step S1 of FIG. 7, the system is waiting for the output of an original read instruction by the external apparatus.

Figure 9:
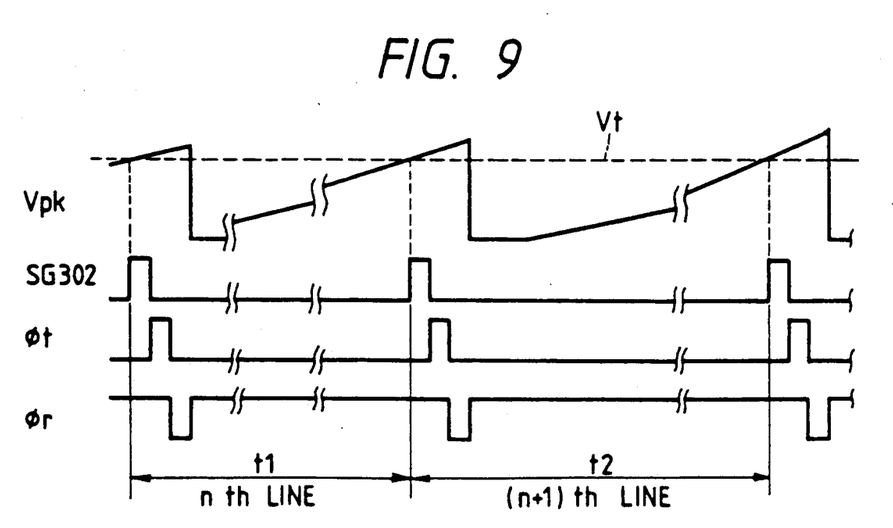
FIG. 9 is a timing chart indicating an output timing of SG302.

When said original read instruction is given, the lamp of original illumination unit 24 is turned on at step S2 and the timer (not indicated in the drawing) in the CPU208 is started up at step S3 and the system waits for the engagement of SG302 at step S4. Here SG302 is the signal given by the proper level detecting circuit 214 of FIG. 4 and as shown in FIG. 9, it is the signal which becomes ON when the peak detecting signal Vpk of image sensor 22 agrees with the value Vt preset by CPU208 in the proper level detecting circuit 14. If the light quantity is sufficient, peak detecting signal Vpk agrees with the predetermined value Vt set earlier, while if light quantity is deficient, long time is required before peak detecting signal Vpk reaches the predetermined level Vt.

When SG302 is engaged, image sensor driving circuit 203 is caused to output $\phi t$ and $\phi r$ signals one after another. At step S5, CPU208 reads the value of said timer and at step 6, the timer is reset and restarted. Thereafter at step S7, the driving rate of the stepping motor is calculated based on the time having passed till peak detecting signal Vpk reaches the predetermined level Vt.

When the time having elapsed until the predetermined level Vt is reached is short, the movement of subscanning of one line is made quicker and if such time is long, the movement of subscanning is made slower. At step S8, the stepping motor is driven at the said driving rate calculated in step S7. At step S9, whether or not the original or the original illumination unit has passed the original reading position is judged and if it has not, the mode returns to step S4.

If it has already passed said original reading position, the mode proceeds to step S10 and a judgment is made whether reading of the original is over or not.

If reading of the original is not over, the image is read out at step S11 and the mode returns to step S4. When reading of the original ends at step S10, the lamp is turned off at step S12 and at step S13, the stepping motor is driven for a predetermined length of time until the original is discharged on original discharge table 32 in the case of "Sheet mode" and the motor is driven in reverse in the case of "Book mode".

Thereafter, the mode returns to step S1 and waits for the issuance of the next read instruction.

Figure 8:
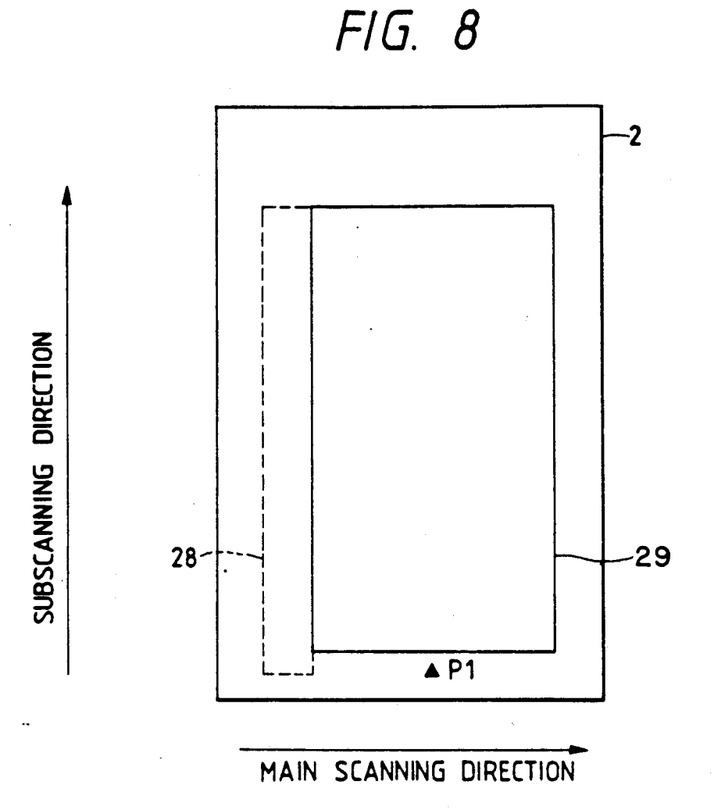
FIG. 8 is a layout view of white reference member 28.

FIG. 8 is an example of arrangement of white reference member 28 used for detection of the proper level of electric signal data of the image to be read. In FIG. 8, white reference member 28 is arranged in the direction of subscanning. Image sensor 22 performs reading of the original including the said white reference member 28. Therefore, as illustrated in FIG. 9, the electric signal obtained by photoelectric conversion of the reflected light coming from the said white reference member 28 at the reading of each line is output from image sensor 22 as peak detection signal Vpk, and SG302 is engaged when the said signal Vpk agrees with the predetermined level Vt. When image sensor 22 is observing the image data of the nth line, if the time until the succeeding SG302 is engaged is assumed to be t1, the stepping motor is driven at the rate calculated from t1 when reading the (n+1)th line which follows the nth line.

The illustrative embodiment described above uses a stepping motor for the driving means but the driving means may be a DC motor with an encoder.

In the explanation of performance given above, the system is so constructed that the time until Vpk reaches predetermined level Vt is measured by the timer inside the CPU, but if exclusive hardware for such an observation is provided, overhead in CPU processing is eliminated and the system may be controlled with higher precision.

Further, it has been explained that the stepping motor is driven while waiting for the engagement of SG302 before the original reading position is reached, but it may be so designed that the stepping motor is driven by the internal timer of CPU208 until the said original reading position is reached.

It goes without saying that the present invention may be applied also to a facsimile machine, a handy scanner, etc.

As explained above, even when, for example, a preheating heater is not provided to the fluorescent lamp, the original can be read without excessive waiting time and thus the throughput of the reading of original is increased. Besides, even when the light quantity fluctuates, the original can be read at proper density.

It is also possible to detect the degeneration of the fluorescent lamp and report the findings.

FIGS. 10-13 illustrate the second illustrative embodiment of the present invention.

In this second illustrative embodiment, the appearance and internal construction of the original image reading apparatus are the same as those of the apparatus shown in FIGS. 2 and 3 described above, except that the illumination unit 24 in the second illustrative embodiment is moved by a DC motor.

Figure 10:
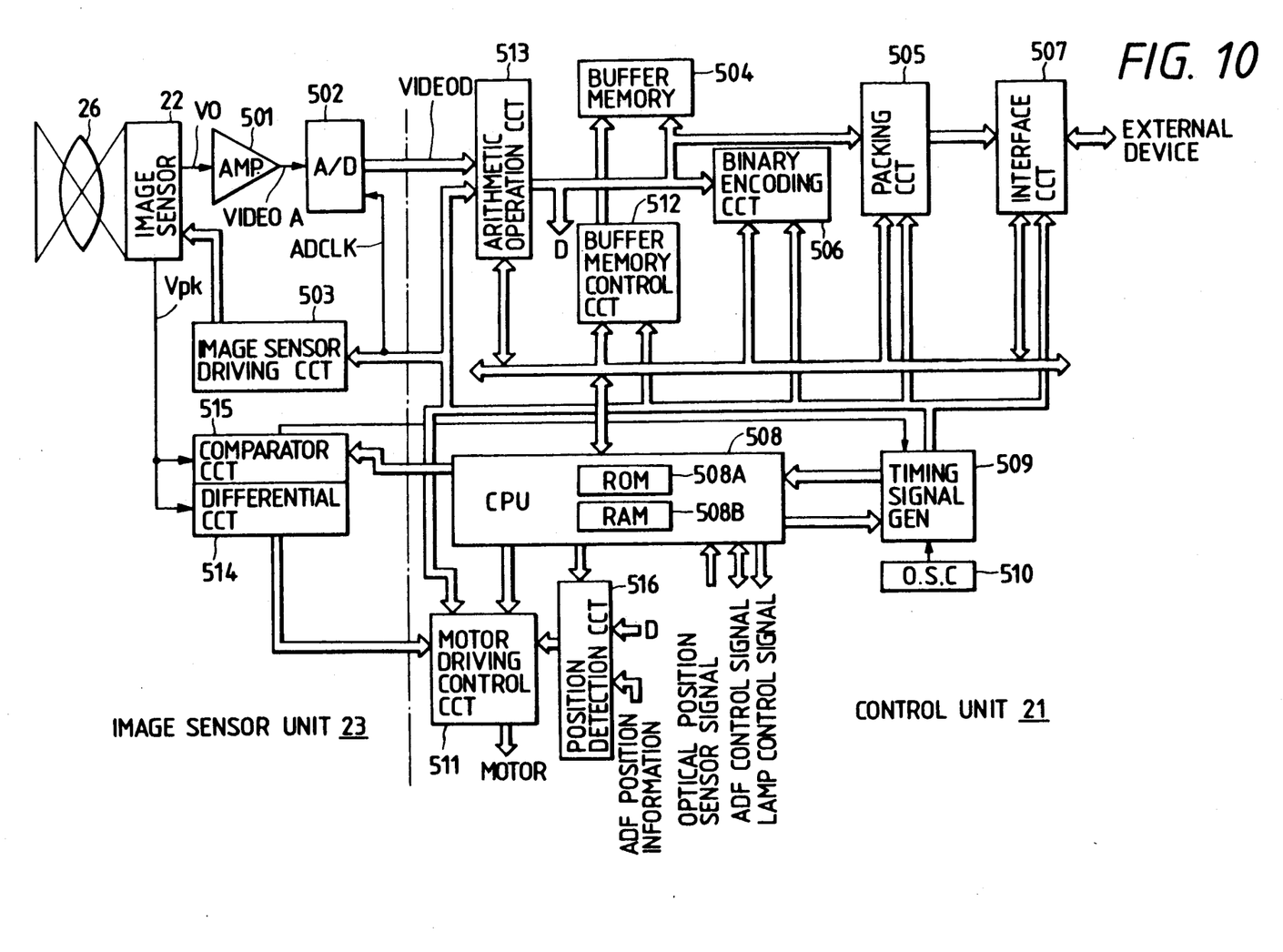
FIG. 10 is a block diagram showing a construction of an image reading apparatus according to a second illustrative embodiment of the present invention.

FIG. 10 is a drawing to illustrate an example of circuit construction used in the second illustrative embodiment.

22 is the image sensor with the construction indicated in FIGS. 5, and 23 is the lens. 503 is an image sensor driving circuit which drives image sensor 22 by the timing signal generated by timing signal generation circuit 509 which will be described later. 501 is an amplifier (AMP) to amplify the image analog signal sent from the image sensor. 502 is an A/D converter (A/D) which converts the amplified image analog signal (VIDEO A) into 8 bit digital signal (VIDEO D) by the timing signal ADCLK generated by timing signal generation circuit 509.

515 is a comparator circuit which compares the level of the peak detecting signal Vpk with the standard level Vt and, upon their agreement, outputs agreement signal SG30L. 514 is a differential circuit which detects the slope of the peak detecting signal Vpk given by image sensor 22, i.e., the rate of increase of light quantity. 513 is an operation circuit which performs shading compensation, γ-compensation, etc. of digital signal (VIDEO D). 504 is a buffer memory having a 4-line buffer construction which temporarily stores the digital signal processed by operating circuit 513. 512 is a buffer memory control circuit which controls the buffer memory 504. 506 is a binary circuit which converts the image data stored in the buffer memory 504 into binary data comparing them with the predetermined threshold level. 505 is the packing circuit which byte-packs the binary data of 8 picture elements in the case of binary data or byte-packs 8 bit data of one picture element in the case of multivalue data. 507 is an interface circuit for external apparatus such as a digital printer, a personal computer, etc. Communication with an external apparatus and output of image data signal to the external apparatus are executed via interface circuit 507.

Figure 13:
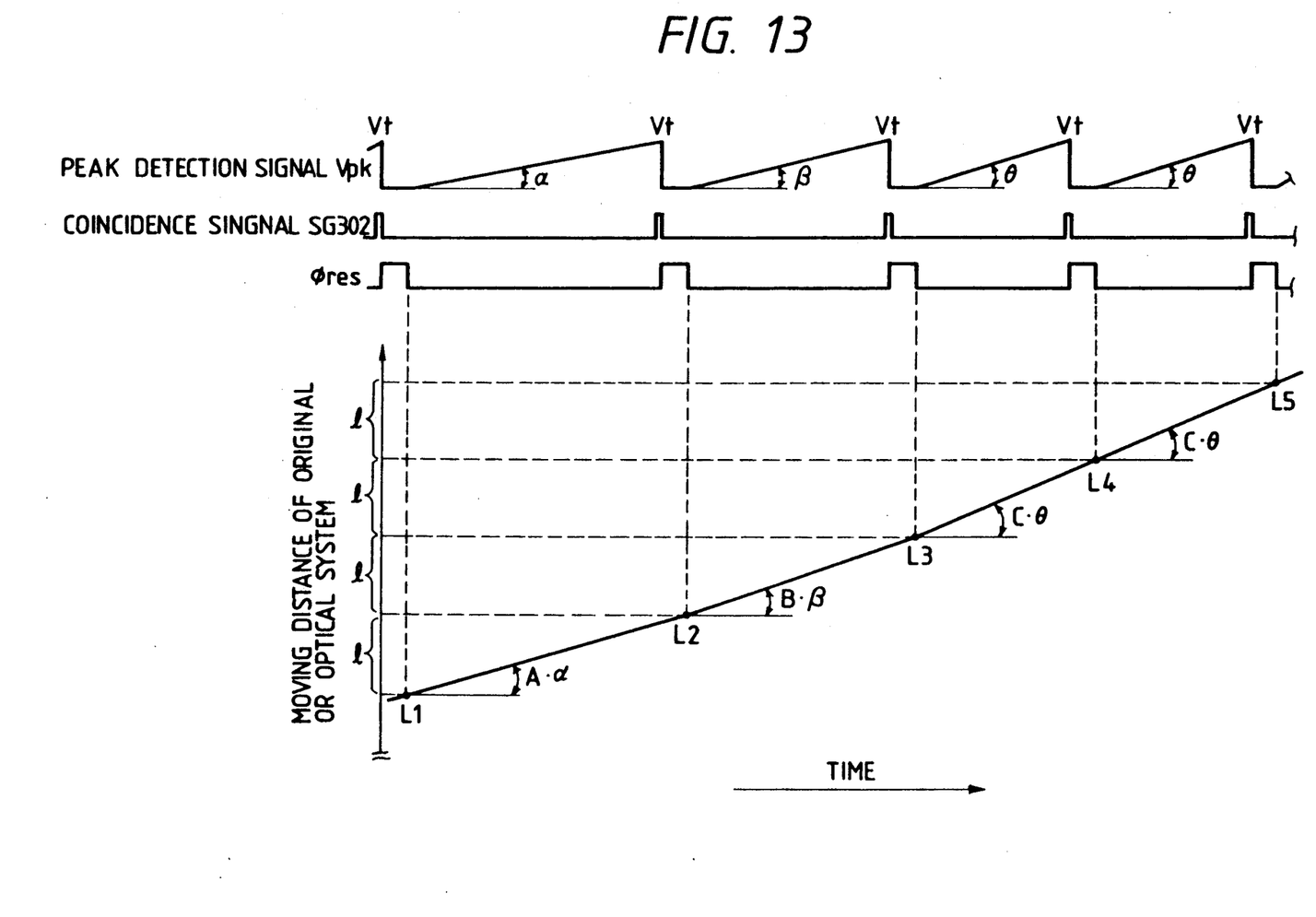
FIG. 13 is a view showing an example of slope of the rise of peak detecting signal Vpk, and an example of the corresponding process of carrying an original or moving an optical system.

516 is a position detecting circuit which detects the read position based on the encoding data to be described later or ADF position data. 511 is a motor driving control circuit which starts up the driving of the DC motor when the level of peak detecting signal Vpk agrees with the standard level Vt and at the same time controls the speed of motion of original illumination unit 24 or ADF3 according to the read position data and the differential (slope) data of peak detecting signal Vpk to be given by the differential circuit 514 i.e., the slope angles α, β and θ indicated in FIG. 13. The voltages impressed on the DC motor shall be Aα, Bβ, and Cθ as illustrated in FIG. 13.

508 is a CPU and the speed control means is composed of image sensor 22, differential circuit 514, and motor driving control circuit 511. 508A is ROM which houses the control program. 508B is the RAM for work.

509 is a timing signal generation circuit which generates the timing signals for image sensor driving circuit 503, A/D converter 502, operation circuit 513, binary encoding circuit 506, packing circuit 505, interface circuit 507, and motor driving control circuit 511 out of the standard signal of oscillator (OSC) 510.

Figure 12:
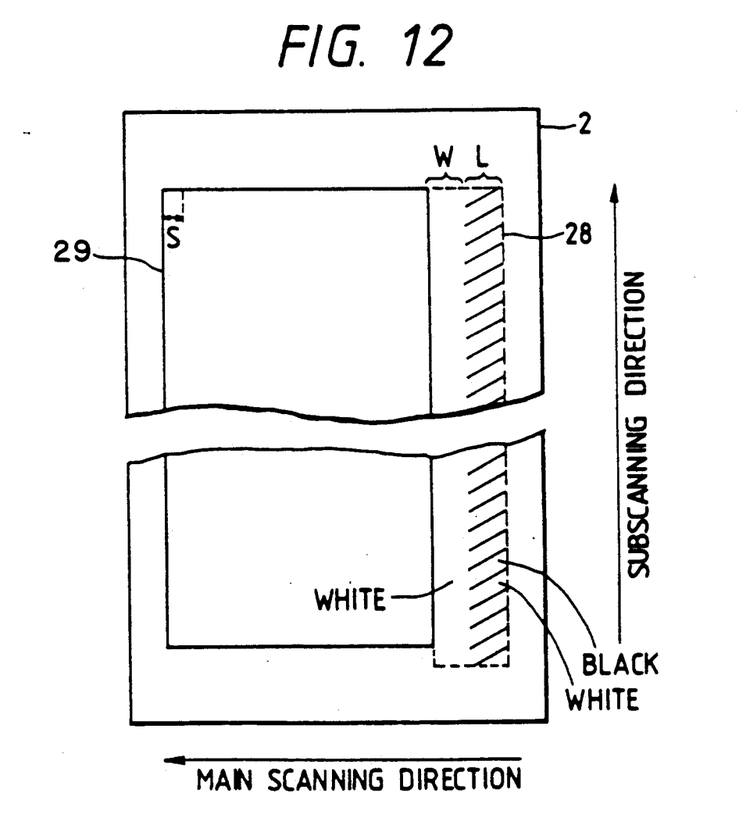
FIG. 12 is a view showing the layout of original white indicator member 28.

FIG. 12 is a drawing to illustrate an example of layout of the original white indicating member 28 provided near platen glass 29.

Original white indicator member 28 is composed of the reference white part W which gives a reference of original white and the position indicating part L comprising the black and white stripe pattern. Image sensor 22 is so constructed that it reads the area wider than platen glass 29 and in "Book mode", it reads the position indicating part L of original white indicating member 28 and outputs the encoding data D. However, in "Sheet mode", it reads the black and white stripe pattern provided on the original carrying roller (not indicated in the drawing) by the width S shown in FIG. 12 and outputs the encoding data D.

Therefore, in "Book mode", the scanning length of the optical system is known by reading the position indicator section L by image sensor 22.

Figure 11:
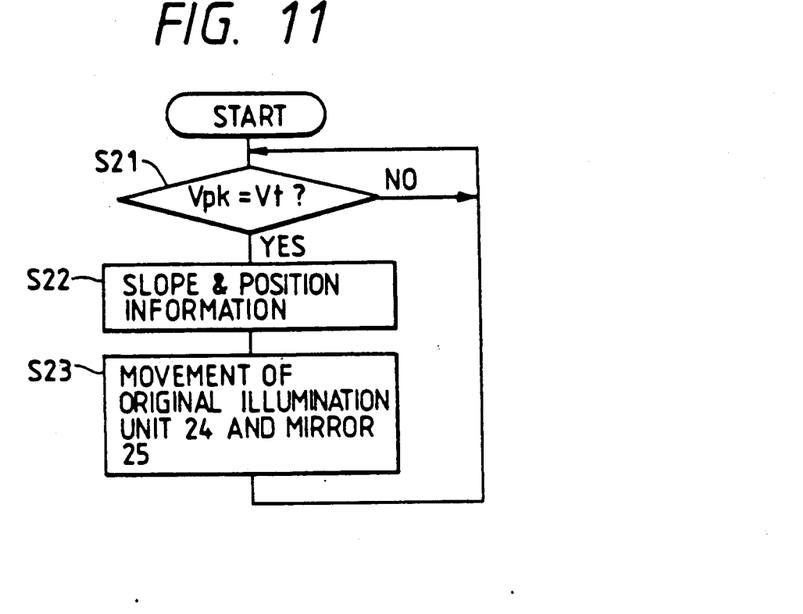
FIG. 11 is a flow chart showing an example of a scanning speed control procedure at the time of "Book Mode" of ROM508A.

FIG. 11 is the flow chart of an example of scanning speed control procedure in "Book mode", stored in the ROM508A.

After turning on the lamp 241 of original illumination unit 24, whether the level of peak detecting signal Vpk has reached a predetermined white signal level Vt or not is judged at step S21.

If it has, the rising slope α of the level of peak detecting signal Vpk is determined at step S22 and by position detecting circuit 516, position data are determined.

Then at step S23, voltage Aα is impressed on the DC motor based on the slope angle α and position data, and original illumination unit 24 and mirror 25 are caused to shift and the step returns to step S21. Thereafter, the steps S21-S23 are repeated for each line, and original illumination unit 24 and mirror 25 are moved based on the slope angle θ and position data and slope angle θ and position data.

If it is so devised that the original carrying speed is controlled in "Sheet mode", the intended objective is attained.

At stated above, when peak detecting signal Vpk reaches the predetermined level Vt earlier, the quantity of light irradiating the original is sufficient and therefore the moving speed of the original or illumination unit may be raised and if, on the contrary, the time until the predetermined level Vt is reached is long, the quantity of light exposing the original is deficient and therefore the moving speed for subscanning is reduced.

Since subscanning is thus executed at the speed corresponding to the quantity of light irradiating the original, a stable image reading is always possible and even when light quantity is small, proper reading of the original image can be executed.

In this illustrative embodiment, an explanation has been given of the example where position data are obtained by reading the position indicator section L shown in FIG. 12 in "Book mode" and the black and white stripe pattern provided on the original carrying roller in "Sheet mode" but it may be so constructed that position data are obtained through an encoder slit provided on the shaft of a DC motor.

Carrying of the original and the moving of the optical system may also be made by a stepping motor and the driving pulse rate of the stepping motor may be controlled based on the differential data of white reference data.

The present invention may be applied also to a facsimile apparatus.

The present invention has been explained with reference to the preferred embodiments, but the present invention is by no means restricted to the constructions of these embodiments, and it goes without saying that modification and alteration thereof are possible within the scope of the claims.

I claim:

1. An image reading apparatus comprising:
    a light source for exposing an original image;
    reading means for photoelectrically reading the exposed original image line by line, said reading means including an accumulation-type image sensor for repeatedly performing an accumulation operation for line by line reading;
    detecting means for detecting an increasing state of an output level of said reading means, which output level increases in accordance with a progression of the accumulation operation of said image sensor, every reading of each line; and
    control means for controlling a reading operation of each line by said reading means on the basis of a detection result of said detecting means.

2. An apparatus according to claim 1, wherein said control means increases or decreases a time for the accumulation operation required by said reading means for reading each line.

3. An apparatus according to claim 1, wherein said apparatus further comprises moving means for moving an image reading position of said reading means, and wherein said control means increases or decreases a moving speed of the image reading position by said moving means.

4. An apparatus according to claim 1, further comprising a reference white board to be read by said reading means.

5. An image reading apparatus comprising:
a light source for exposing an original image;
reading means for photoelectrically reading the exposed original image line by line, said reading means including an accumulation-type image sensor for repeatedly performing an accumulation operation for line by line reading;
moving means for moving an image reading position of said reading means;
detecting means for detecting a time taken until an output level of said reading means reaches a predetermined level for every reading of each line, the output level increasing in accordance with a progression of the accumulation operation of said image sensor; and
control means for controlling a speed of movement of the image reading position by said moving means in accordance with a time detected by said detection means.

6. An apparatus according to claim 5, wherein said control means increases or decreases the accumulation operation time required for reading each line by said reading means.

7. An apparatus according to claim 5, wherein said control means performs the control operation based on an increasing rate of level of an output of said reading means.

8. An apparatus according to claim 5, wherein said image sensor comprises a plurality of light receiving elements, and wherein said detecting means detects the time taken until a peak level of outputs corresponding to said plurality of light receiving elements reaches the predetermined level.

9. An apparatus according to claim 5, wherein said control means controls the reading operation in accordance with the time taken until the output level of said reading means reaches the predetermined level, which has been detected by said detecting means.

10. An apparatus according to claim 1, wherein said control means performs the control operation based on an increasing rate of a level of an output of said reading means.

11. An apparatus according to claim 1, wherein said image sensor comprises a plurality of light receiving elements.

* * * * *

UNITED STATES PATENT AND TRADEMARK OFFICE
CERTIFICATE OF CORRECTION

PATENT NO. : 5,032,712
DATED : July 16, 1991
INVENTOR(S) : YASUO ITO

It is certified that error appears in the above-identified patent and that said Letters Patent is hereby corrected as shown below:

IN THE DRAWINGS

Sheet 10, Fig. 13

"SINGNAL" should read -- SIGNAL --.

COLUMN 1

Line 27, "temperature" should read -- temperatures --.
   Line 29, "(Fig. 1A)" should read -- (Fig. 1A), --.

COLUMN 2

Line 43, "sheet shaped" should read -- sheet-shaped --.
   Line 44, "a" should read -- an --.
   Line 46, "not (shown)" should read -- (not shown) --.

COLUMN 3

Line 4, "the" should deleted.
   Line 8, "H)" should be deleted.

COLUMN 4

Line 1, "entered" should read -- supplied --.

COLUMN 5

Line 48, "of input" should read -- of an input --.

UNITED STATES PATENT AND TRADEMARK OFFICE
CERTIFICATE OF CORRECTION

PATENT NO. : 5,032,712
DATED : July 16, 1991
INVENTOR(S) : YASUO ITO It is certified that error appears in the above-identified patent and that said Letters Patent is hereby corrected as shown below:

COLUMN 7

Line 32, "14." should read -- 214 --.

COLUMN 10

Line 14, "angle $\theta$" (first occurrence) should read -- angle $\beta$ --.
Line 19, "At" should read -- As --.

Signed and Sealed this

Sixth Day of July, 1993

Attest:

MICHAEL K. KIRK

*Attesting Officer*  Acting Commissioner of Patents and Trademarks